ured in the camera or holder referred to
UNITED STATES PATENT OFFICE.

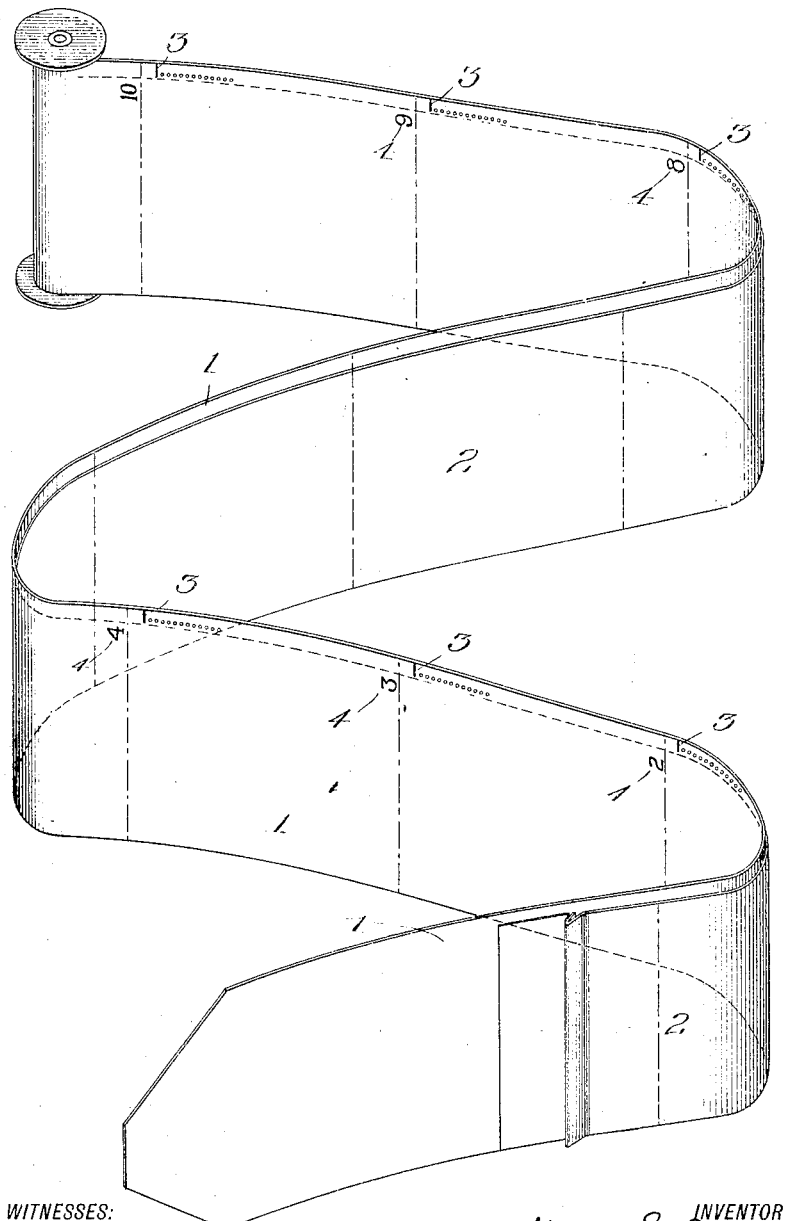

HARRY LE B. GRAY, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC-FILM CARTRIDGE.

1,225,951.   Specification of Letters Patent.   Patented May 15, 1917.

Original application filed May 18, 1914, Serial No. 839,232. Divided and this application filed June 30, 1915. Serial No. 37,372.

*To all whom it may concern:*

Be it known that I, HARRY LE B. GRAY, of Rochester, county of Monroe, and State of New York, have invented certain new and useful Improvements in Photographic-Film Cartridges; and I do declare the following to be a full, clear, and exact description of the same, which will enable those skilled in the art to make, use, and practise my invention.

This case is a division of my application Serial No. 839,232, filed May 18, 1914, for photographic cameras or holders and films therefor, which resulted in Patent No. 1,192,058, dated July 25, 1916.

My invention relates to a spool or cartridge embodying a strip of photographic film associated with a flexible translucent covering of such permeability to light, that a designation applied on its surface may be light recorded through the single thickness of covering material upon the film, but that a plurality of layers, as is used when the covering is rolled up with the film, may be substantially opaque to actinic light.

My invention also relates to a film cartridge, adapted to be used with a suitable holder or camera provided with means permitting autographic designations or memoranda to be light printed through the flexible covering upon the film, the covering bearing upon its surface one or more fixed characters such as sequential designations, that may be light printed upon the film in proximity to the memoranda.

This cartridge film may be used in any suitable type of camera involving any desired method of recording autographic designations, but is particularly adapted for use in a camera, or holder for sensitized photographic material, such as shown in the above patent embodying an opening and a closure therefor in the rear side opposite the exposure aperture and a protective covering between such opening and the film or sensitized material, the covering being normally impermeable to actinic light, but capable of being rendered locally translucent by writing thereagainst with a stylus, such that actinic light may strike through and fog the film under the written lines.

The accompanying drawing shows a perspective view of the film cartridge partially unrolled.

In order that the autographic designations produced in the camera or holder referred to and the numerals or other sequential designations of the different exposures of the film may be light-printed upon the film itself and so that the operator may determine the proper feeding of the film in the camera, I provide my film cartridge of special construction adapted to be used in connection with the mechanism described. This cartridge embodies a strip of paper of similar material longer than the film and corresponding in size and shape to the ordinary black paper backing on the film cartridge in general use, but in the present instance instead of being opaque and when the cartridge is used for light-printing designations on the film, said paper is more or less translucent and preferably of an orange red color, of such density that while a single thickness will not prevent the passage of actinic light, several convolutions thereof will effectually exclude light and form an opaque covering for the film, thus preventing it from being light struck when the film and paper are wound upon one of the spools and outside of the camera or holder. The paper backing 1 is a trifle wider than the strip of sensitized transparent film indicated by 2, which is or may be attached at one or both ends to the paper in the usual manner and said paper is provided at its extreme edge with a designating mark 3, adapted to be visible through the usual aperture covered by the usual ruby window arranged in the camera back at one edge of the exposing aperture. The paper covering 1 is provided with sequential designating marks 4 of such nature that their outlines may be light printed upon the film preferably by being printed thereon in black or opaque ink at a distance from the mark 3 equal to the length of the exposure for which the camera or holder is adapted, that is to say, substantially the length of the exposing aperture itself. This designation 4 will be visible through the opening in the camera back when the lid or cover is removed, and the flexible covering or carbon paper is slightly narrower than the film, so that when said cover is open, light entering the camera will pass through the cover paper 1 and print the designation 4 upon the film, the ink of said designation preventing the passing of light, so that the number of the exposure will appear in the negative, in the camera or holder shown in the patent, as a transparent figure surrounded by a blackened mortise or field.

In using the holder or camera in connection with the cartridge described, the operator winds the film forward until one of the designating marks 3 appears opposite the aperture covered by the window. He then makes the exposure in the usual way, then moves the lock from the cover, clamping the film and the covering upon the frame, and with a pencil or stylus writes upon the covering any data relating to the exposure, thus rendering it light permeable on the designated lines and allows light either from the sun or an artificial source to enter the slot and affect the film beneath, not only through the lines traced by the stylus in the covering but also through the sequential designation 4 marked on the covering paper at the side of the covering. He then closes the cover and for the next exposure winds forward the film and covering 1 in the usual manner until another mark 3 appears at the opening covered by the ruby glass or window.

Inasmuch as the sequential designations printed on the film, in this embodiment of my invention are practically in line with the part of the film used in making the pictures, it is essential that the door or cover through which the light printing is accomplished be closed during the feeding of the film.

While it is true that the portion of the film which passes beneath the window or aperture through which the designation 3 is observed may be fogged or exposed as the film is drawn forward in the camera or holder, this exposed portion is beside the margin of the exposure aperture and will, therefore, not appear in the finished negative but is a part of the film which is ordinarily wasted.

I claim as my invention:

1. A film cartridge consisting of a strip of flexible film and a flexible backing or covering strip of translucent flexible material associated therewith having sequential designations printed thereon adapted to be light printed on the film by exposure to actinic light.

2. A film cartridge consisting of a strip of flexible film and a flexible backing or covering strip of translucent flexible material associated therewith having sequential designations printed thereon and adapted to be printed on the film by exposure to actinic light with said designations interposed and additional designations at the margin of the covering strip.

3. A film cartridge consisting of a strip of flexible film and a flexible backing or covering strip of translucent flexible material associated therewith having sequential designations printed thereon and adapted to be printed on the film by exposure of the film to actinic light passing through the covering and additional designations printed on the margin of the covering at points removed from the first mentioned designations.

4. A film cartridge consisting of a strip of flexible photographic film and a flexible translucent covering strip of greater length than the film and having a marginal portion extending beyond a side edge of the film, said strip having designating marks inside of the marginal portion adapted to be printed on the film by exposure to actinic light and further marks on said marginal portion as an aid in positioning the film within a camera.

5. A film cartridge consisting of a strip of flexible film and a flexible covering strip associated therewith having sequential designations permanently indicated thereon which are adapted to be light printed on the film by light passing through the strip when the designation bearing portion of the covering strip and the associated portion of the film are exposed to actinic light.

HARRY LE B. GRAY.

Witnesses:
CLYDE H. MILLER,
J. E. SHEARER.